(12) United States Patent
Yoshigoe et al.

(10) Patent No.: US 7,710,057 B2
(45) Date of Patent: May 4, 2010

(54) RAINDROP QUANTITY SENSING APPARATUS AND WIPER CONTROL SYSTEM

(75) Inventors: Taketoshi Yoshigoe, Kariya (JP); Taiji Morishita, Kariya (JP)

(73) Assignee: Denso Corporation, Kariya (JP)

( * ) Notice: Subject to any disclaimer, the term of this patent is extended or adjusted under 35 U.S.C. 154(b) by 416 days.

(21) Appl. No.: 11/882,807

(22) Filed: Aug. 6, 2007

(65) Prior Publication Data
US 2008/0028563 A1 Feb. 7, 2008

(30) Foreign Application Priority Data
Aug. 7, 2006 (JP) .............................. 2006-214927

(51) Int. Cl.
*H02P 1/04* (2006.01)
(52) U.S. Cl. ...................... 318/483; 318/282; 318/283; 318/466; 318/468
(58) Field of Classification Search ................ 318/483, 318/282, 283, 466, 468
See application file for complete search history.

(56) References Cited

U.S. PATENT DOCUMENTS

| | | | |
|---|---|---|---|
| 5,276,388 A | 1/1994 | Levers | |
| RE35,422 E | 1/1997 | Levers | |
| 6,617,813 B2 * | 9/2003 | Morishita et al. | 318/444 |
| 6,958,585 B2 * | 10/2005 | Kim | 318/2 |
| 7,098,618 B2 * | 8/2006 | Morishita | 318/444 |
| 7,154,241 B2 * | 12/2006 | Kokuryo et al. | 318/483 |
| 7,235,944 B2 * | 6/2007 | Morishita | 318/483 |
| 2008/0030159 A1 * | 2/2008 | Hiramoto et al. | 318/483 |

FOREIGN PATENT DOCUMENTS

| | | |
|---|---|---|
| DE | 102 61 101 A1 | 7/2004 |
| EP | 1 431 143 | 6/2004 |
| JP | 2000-85538 | 3/2000 |

OTHER PUBLICATIONS

Office Action dated Jul. 9, 2008 in DE Application No. 10 2007 000 413.5 with English translation.

* cited by examiner

*Primary Examiner*—Bentsu Ro
*Assistant Examiner*—Erick Glass
(74) *Attorney, Agent, or Firm*—Nixon & Vanderhye PC

(57) ABSTRACT

A raindrop sensor outputs a measurement signal, which corresponds to a quantity of raindrops in a predetermined sensing range in a wiping range on a windshield. A prohibited time period setting arrangement sets a time period, during which a wiper blade is predicted to pass through the predetermined sensing range, as a raindrop quantity sensing prohibited time period based on an elapsed time from a time point of supplying a drive command signal to a wiper motor, which drives the wiper blade. The determining arrangement determines the quantity of raindrops on the windshield based on the measurement signal outputted from the raindrop sensor in a raindrop quantity sensing execution time period, which is outside of the raindrop quantity sensing prohibited time period.

12 Claims, 5 Drawing Sheets

MOTOR STATE

OPERATING SIGNAL

DRIVE COMMAND SIGNAL

FLAG STATE

RAINDROP QUANTITY SENSING APPARATUS AND WIPER CONTROL SYSTEM

CROSS REFERENCE TO RELATED APPLICATION

This application is based on and incorporates herein by reference Japanese Patent Application No. 2006-214927 filed on Aug. 7, 2006.

BACKGROUND OF THE INVENTION

1. Field of the Invention

The present invention relates to a raindrop quantity sensing apparatus and a wiper control system.

2. Description of Related Art

For example, a vehicle, such as an automobile, has a wiper apparatus to wipe a windshield of the vehicle. Wiper blades of the wiper apparatus are driven by a drive force generated by a wiper motor (drive source) based on a drive command signal. Each of the wiper blades is swung forward from a stop position to a return position of a wiping range of the windshield and is then swung backward from the return position to the stop position. By repeating the above described series of wiping action of the wiper blades, raindrops on the wiping range of the windshield are wiped.

Japanese Unexamined Patent Publication Number 2000-085538 discloses one such a technique. According to this technique, a raindrop sensor is placed at a top center location of the windshield of the vehicle. More specifically, the raindrop sensor is placed on a vehicle passenger compartment side of the windshield at the location near a room mirror, i.e., a rearview mirror. A quantity of raindrops in a sensing range of the raindrop sensor on the windshield is measured at the time, at which the wiper blade reaches the sensing range, and is thereafter measured once again at the time, at which the wiper blade reaches the sensing range. Then, an amount of a change in the quantity of raindrops is computed based on these measurements. Then, the quantity of raindrops, which is measured right before the reaching of the wiper blade to the sensing range, is added to the amount of change. In this way, the quantity of raindrops is measured without a need for providing a raindrop quantity sensing prohibited time period, during which the sensing of the quantity of raindrops is prohibited.

However, when the quantity of raindrops is determined based on the measurement signal of the raindrop sensor, which is obtained while the wiper blade is amid of moving in the sensing range, the quantity of raindrops may be erroneously measured. For example, the state of raindrops in the sensing range may be disturbed by the wiper blade, or the wiped water, which is wiped by the wiper blade and is placed in the sensing range, or the adhered water, which is adhered to the wiper blade, may be erroneously additionally measured. Thus, in such a case, the quantity of raindrops fell from the sky on the sensing range may not be accurately determined.

In view of the above disadvantage, the following technique has been proposed. A time period, during which the wiper blade passes the sensing range of the raindrop sensor, is set as a raindrop quantity sensing prohibited time period based on an elapsed time from the time of sensing a leading edge of an operating signal, which is outputted at the time of actual wiping movement of the wiper blade. The remaining time period other that the raindrop quantity sensing prohibited time period is set as a raindrop quantity sensing execution time period. The measurement signal of the raindrop sensor, which is outputted during the raindrop quantity sensing prohibited time period, is not used to determine the quantity of raindrops present in the sensing range. Instead, the measurement signal of the raindrop sensor, which is outputted during the raindrop quantity sensing execution time period, is used to determine the quantity of raindrops in the sensing range. In this way, it is possible to eliminate the above-described influences encountered at the time of movement of the wiper blade through the sensing range of the raindrop sensor.

However, recently, various types of vehicles are equipped with the raindrop quantity sensing apparatus, and it has been demanded to place the raindrop sensor to the other location (s), such as a lower part of the windshield other than the top center location of the windshield of the vehicle. However, when the raindrop sensor, which is placed at the lower part of the windshield, is operated in the above-described manner, in which the raindrop quantity sensing prohibited time period is set based on the elapsed time from the time of measuring the leading edge of the operating signal, the following disadvantages may be encountered.

In general, even when a stop command for stopping the wiper motor and thereby stopping the reciprocal wiping movement of the wiper blade is received from a user of the vehicle through a wiper switch, the reciprocal wiping movement of the wiper blade cannot be stopped immediately. In such a case, the wiper motor terminates the reciprocal wiping movement of the wiper blade upon moving the wiper blade to the stop position to provide clear front view. Therefore, as long as the provision of the clear view to the user is required, it is not possible to completely synchronize the operating state/stopped state of the wiper motor with the ON-state/OFF-state of the wiper switch. Thus, in order to notify the actual operational state of the wiper motor, the wiper motor outputs the operating signal, which indicates the operating state of the wiper motor, when the wiper motor is actually placed in the operating state. Also, the wiper motor outputs a negate signal, which indicates the stopped state of the wiper motor, when the wiper motor is actually placed in the stopped state.

However, none of the operating signal and the negate signal indicates the actual operational state of the wiper motor. Specifically, it is required to avoid simultaneous outputting of the operating signal and the negate signal, which indicate the opposite states, respectively. Therefore, in order to avoid this, the wiper motor outputs the operating signal after the lapse of a certain delay time period from the time of shifting of the operational state of the wiper motor from the stopped state to the operating state. Also, the outputting of the operating signal is stopped before the shifting of the operational state of the wiper motor from the operating state to the stopped state. Furthermore, the wiper motor outputs the negate signal after the wiper motor is actually placed in the stopped state. Thus, when the sensing range of the raindrop sensor is placed adjacent to the stop position of the wiper blade, by for example, providing the raindrop sensor at the lower part of the windshield, it may happen that the wiper blade has already passed the sensing range before the outputting of the operating signal upon the shifting of the operational state of the wiper motor from the stopped state to the operating state. In such a case, it is not possible to set the time period, during which the wiper blade passes the sensing range of the raindrop sensor, as the raindrop quantity sensing prohibited time period. As a result, it is not possible to eliminate the above-described influences on the result of the determination of the quantity of raindrops at the time of passing of the wiper blade through the sensing range of the raindrop sensor. Thereby, it is difficult to accurately determine the quantity of raindrops in the sensing range of the raindrop sensor.

In order to avoid the above disadvantages caused by the time difference, it is conceivable to set the sensing range of the raindrop sensor remote from the stop position of the wiper blade. However, in such a case where the sensing range of the raindrop sensor is set remote from the stop position of the wiper blade, the sensing range of the raindrop sensor is normally placed in a vertical center part of the windshield. When the raindrop sensor is placed in such a location, the sight of the user of the vehicle is disadvantageously reduced or interfered. Furthermore, the positioning of the raindrop sensor in such a location is prohibited by the law in many countries.

SUMMARY OF THE INVENTION

The present invention addresses the above disadvantages. Thus, it is an objective of the present invention to provide a raindrop quantity sensing apparatus and a wiper control system, which enables implementation of more design freedom with respect to a location of a raindrop sensor.

To achieve the objective of the present invention, there is provided a raindrop quantity sensing apparatus for measuring a quantity of raindrops on a windshield of a vehicle, on which a wiper blade of a wiper apparatus is reciprocally swung between a stop position and a return position in a wiping range of the windshield by a drive force generated from a drive source of the wiper apparatus, which is driven every time a drive command signal is supplied to the drive source. The raindrop quantity sensing apparatus includes a raindrop sensor, a prohibited time period setting means and a determining means. The raindrop sensor outputs a measurement signal, which corresponds to the quantity of raindrops in a predetermined sensing range in the wiping range on the windshield. The prohibited time period setting means is for setting a time period, during which the wiper blade is predicted to pass through the predetermined sensing range, as a raindrop quantity sensing prohibited time period based on an elapsed time from a time point of supplying the drive command signal to the drive source. The determining means is for determining the quantity of raindrops on the windshield based on the measurement signal outputted from the raindrop sensor in a raindrop quantity sensing execution time period, which is outside of the raindrop quantity sensing prohibited time period.

To achieve the objective of the present invention, there is also provided a wiper control system, which includes a wiper apparatus, a raindrop sensor, a prohibited time period setting means, a determining means and a wiper control means. The wiper apparatus includes a drive source and a wiper blade. The wiper blade is reciprocally swung between a stop position and a return position in a wiping range of a windshield by a drive force generated from the drive source, which is driven every time a drive command signal is supplied to the drive source. The raindrop sensor outputs a measurement signal, which corresponds to the quantity of raindrops in a predetermined sensing range in the wiping range on the windshield. The prohibited time period setting means is for setting a time period, during which the wiper blade is predicted to pass through the predetermined sensing range, as a raindrop quantity sensing prohibited time period based on an elapsed time from a time point of supplying the drive command signal to the drive source. The determining means is for determining the quantity of raindrops on the windshield based on the measurement signal outputted from the raindrop sensor in a raindrop quantity sensing execution time period, which is outside of the raindrop quantity sensing prohibited time period. The wiper control means is for controlling the wiper apparatus according to the quantity of raindrops, which is determined by the determining means. The wiper control means supplies the drive command signal to the drive source.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A raindrop quantity sensing apparatus and a wiper control system having the same according to an embodiment of the present invention will be described with reference to FIGS. 1 to 6.

Figure 1:
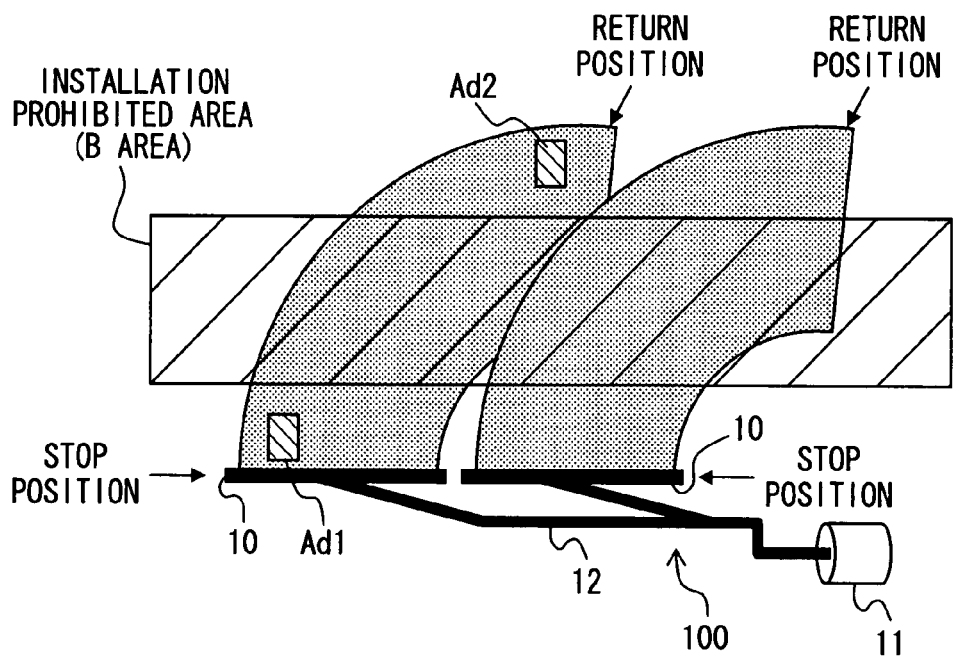
FIG. 1 is a schematic diagram showing a raindrop quantity sensing apparatus and a wiper control system having the same according to an embodiment of the present invention.
Figure 2:
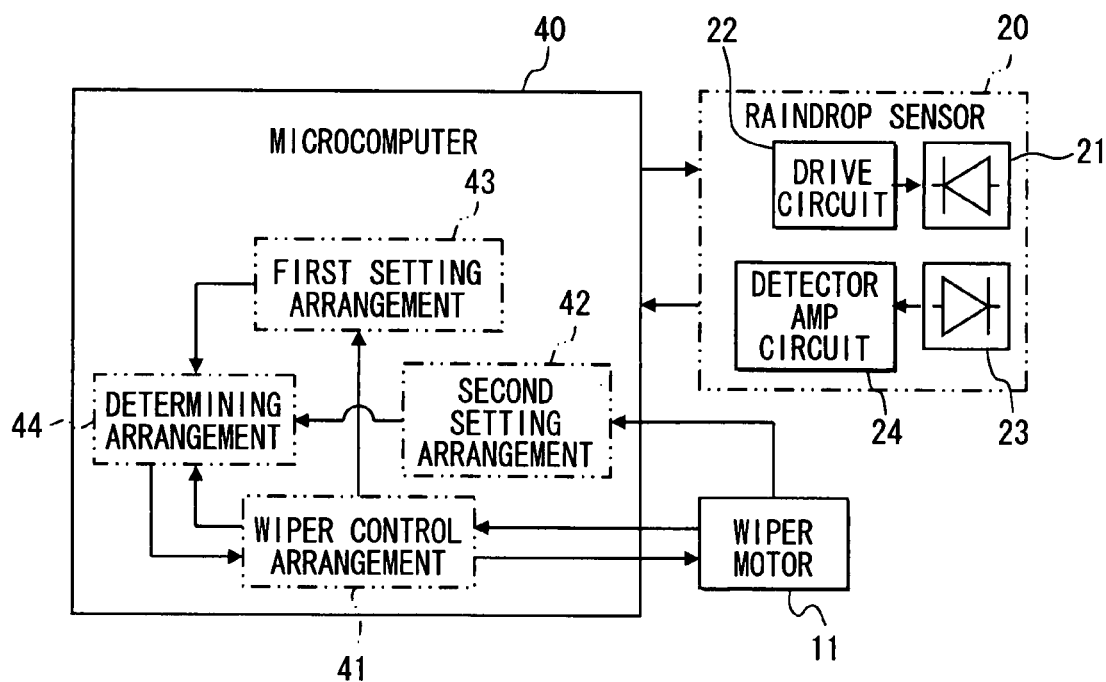
FIG. 2 is a block diagram showing an entire structure of the wiper control system.

With reference to FIGS. 1 and 2, the wiper control system of the present embodiment includes a wiper apparatus 100, a raindrop sensor 20 and a microcomputer 40. The wiper apparatus 100 includes two wiper blades 10, a wiper motor (a drive source) 11 and a transmission mechanism 12. Each wiper blade 10 is reciprocally swung by a drive force generated by the wiper motor 11. Therefore, the wiper blade 10 is swung forward from a stop position at one end of the wiping range to a return position at the other end of the wiping range and is then swung backward from the return position to the stop position. The raindrop sensor 20 outputs a measurement signal, which corresponds to a quantity of raindrops adhered to a sensing range Ad1 in the wiping range of one of the wiper blades 10 on the windshield. The microcomputer 40 obtains information of the quantity of raindrops in the sensing range Ad1 from the raindrop sensor 20 and information of a wiping pattern from a wiper switch (not shown) upon selection of the wiping pattern by a user through the wiper switch. The microcomputer 40 executes, for example, a wiper control operation for controlling the wiper motor 11 based on the information of the quantity of raindrops received from the raindrop sensor 20 and the information of the wiping pattern received from the wiper switch.

As shown in FIG. 1, the wiper motor 11 provides the drive force to the wiper blade 10 through the transmission mechanism 12, such as a link mechanism, of a well known type. As a result, each wiper blade 10 is swung forward from the stop position to the return position and is then swung backward from the return position to the stop position. In this way, the wiper blade 10 wipes the wiping range, which is defined between the stop position and the return position. As shown in FIG. 1, the wiping range of the wiper blade 10 has a fan shape.

With reference to FIG. 2, the above described reciprocal wiping operation of the wiper blade 10 is executed when a drive command signal is supplied from a wiper control arrangement 41 of the microcomputer 40 to the wiper motor 11. When the wiper motor 11 is driven to generate a drive force upon the supplying of the drive command signal, the wiper motor 11 outputs an operating signal, which indicates the executing state of the reciprocal wiping operation of the wiper blade 10, to a second prohibited time period setting arrangement 42 of the microcomputer 40. The drive command signal, which is supplied from the wiper control arrangement 41 to the wiper motor 11, and the operating signal, which is outputted from the wiper motor 11 to the second prohibited time period setting arrangement 42, will be described in detail below.

The raindrop sensor 20 is provided to a passenger compartment side of the windshield at a lower part of the wiping range of the windshield, i.e., is placed adjacent to the stop position of the wiper blade 10. In FIG. 1, instead of showing the raindrop sensor 20, the sensing range Ad1 of the raindrop sensor 20 is indicated to indicate the location of the raindrop sensor 20 on the windshield.

As shown in FIG. 2, the raindrop sensor 20 includes a light emitting device 21 and a light receiving device 23. The light emitting device 21 may be a light emitting diode, which outputs an infrared light toward the sensing range Ad1 of the windshield. The light receiving device 23 receives a reflected light, which is outputted from the light emitting device 21 and is reflected from the windshield W, and outputs a measurement value, which corresponds to a quantity of the received light. Furthermore, the light emitting device 21 is connected to the microcomputer 40 through a light emitting device drive circuit 22, so that turning on and turning off of the light emitting device 21 are controlled by the microcomputer 40. Furthermore, the light receiving device 23 is connected to the microcomputer 40 through a detector and amplifier circuit 24 to output a measurement signal, which corresponds to the sensed quantity of raindrops, to the microcomputer 40. With the above described configuration, when no raindrop is present in the sensing range Ad1, the infrared light, which is outputted from the light emitting device 21, is substantially entirely reflected by the windshield and is received by the light receiving device 23. However, when raindrops are present in the sensing range Ad1, a portion of the infrared light, which is outputted from the light emitting device 21, penetrates through the windshield through the raindrops present in the sensing range Ad1. Thus, the quantity of light received by the light receiving device 23 is decreased. Therefore, the quantity of raindrops in the sensing range Ad1 is optically sensed based on the relationship between the quantity of raindrops in the sensing range Ad1 and the quantity of light received by the light receiving device 23. When the quantity of raindrops in the sensing range Ad1 becomes relatively large, the measurement signal of the raindrop sensor 20 becomes relatively small, and vice versa.

The microcomputer 40 includes a CPU, a storage device, an input circuit, an output circuit and a power supply circuit. The CPU executes control operations and computing operations. The storage device includes a read only memory (ROM) for storing various programs and data as well as a random access memory (RAM). The input circuit may include an A/D converter. In this embodiment, functional arrangements of the microcomputer 40 for implementing the various operations of the wiper control system will be schematically described. These functional arrangements include the wiper control arrangement 41, a first prohibited time period setting arrangement 43, the second prohibited time period setting arrangement 42 and a determining arrangement 44. The wiper control arrangement 41 controls the drive operation of the wiper blades 10. Each of the first and second prohibited time period setting arrangements 43, 42 sets a time period, during which the wiper blade 10 moves in the sensing range Ads of the raindrop sensor 20, as a raindrop quantity sensing prohibited time period. The determining arrangement 44 determines the quantity of raindrops on the windshield based on a change in the measurement signal, which is outputted from the raindrop sensor 20 in a raindrop quantity sensing execution time period, which is a time period other than the raindrop quantity sensing prohibited time periods that are set by the first and second prohibited time period setting arrangements 43, 42.

The wiper control arrangement 41 receives information of a current rainfall state from the determining arrangement 44 and information of the selected wiping mode from the wiper switch and drives the wiper motor 11 based on them. Although not depicted in the drawings, a user can manually operate the wiper switch among a wiping stop position (an OFF mode), an automatic control position (an AUTO mode), a low speed wiping position (a LO mode) and a high speed wiping position (a HI mode). The wiper switch may be rotated to a corresponding one of the four positions to execute the corresponding operational mode. When the corresponding one of the operational modes is selected, the wiper switch outputs information of the selected operational mode to the microcomputer 40 (the wiper control arrangement 41).

When the quantity of raindrops in the sensing range Ad1 is determined based on the measurement signal of the raindrop sensor 20, which is obtained while the wiper blade 10 is amid of moving in the sensing range Ad1, the state of raindrops in the sensing range Ad1 may be disturbed by the wiper blade 10. Also, during this time, the wiped water, which is wiped by the wiper blade 10 and is placed in the sensing range Ad1, or the adhered water, which is adhered to the wiper blade 10, may be erroneously additionally measured. Thus, in such a case, the quantity of raindrops fell from the sky on the sensing range Ad1 may not be accurately determined.

Thus, the second prohibited time period setting arrangement 42 receives the above-described operating signal from the wiper motor 11 and sets a time period, during which the wiper blade 10 passes the sensing range Ad1 of the raindrops sensor 20 in a return stroke period for moving from the return position to the stop position, as a return stroke raindrop quantity sensing prohibited time period based on an elapsed time from a time point of measuring a leading edge of the operating signal.

Specifically, the second prohibited time period setting arrangement 42 sets the return stroke raindrop quantity sensing prohibited time period as follows. That is, the second prohibited time period setting arrangement 42 sets a time point, at which a predetermined time period T3 has elapsed since the starting of the outputting of the above-described operating signal, as a start time point of the return stroke raindrop quantity sensing prohibited time period. Furthermore, the second prohibited time period setting arrangement 42 sets a time point, at which a predetermined time period T4 has elapsed since the starting of the outputting of the above-described operating signal, as an end time point of the return stroke raindrop quantity sensing prohibited time period. Here, the predetermined time period T3 is set to a continuous time period, which includes a time period between the time point of starting the outputting of the operating signal (the time point of sensing the leading edge of the operating signal) and the time point of reaching of the wiper blade 10 to the sensing range Ad1 in the return stroke period of the wiper blade 10 from the return position to the stop position, and a predetermined tolerance time period (a minus tolerance time period to be subtracted). Furthermore, the predetermined time period T4 is set to a continuous time period, which includes a time period between the time point of starting the outputting of the operating signal and the time point of leaving of the wiper blade 10 out of the sensing range Ad1 in the return stroke period of the wiper blade 10, and a predetermined tolerance time period (a plus tolerance time period to be added). Therefore, the predetermined time period T4 is set to be longer than the predetermined time period T3.

Each of the predetermined time period T3 and the predetermined time period T4 has the tolerance time period for the following reason. Specifically, the wiping level of the wiper blade 10 may be sequentially changed to the intermittent drive operation at the long intermittent time interval, the intermittent drive operation at the short intermittent time interval, the continuous drive operation at the low wiping speed and the continuous drive operation at the high wiping speed depending on a need. The intermittent time interval and the wiping speed may vary from a vehicle to vehicle regardless of a vehicle model (regardless of the same model or different models). Furthermore, the raindrop sensor 20 is placed in the predetermined location in the windshield. Regardless of the vehicle model, the location of the raindrop sensor may vary. Thus, the wiping speed of the wiper blade 10 and the distance from the stop position to the sensing range Ad1 of the raindrop sensor 20 may vary from the vehicle to vehicle, so that it is difficult to accurately set the time period, during which the wiper blade 10 moves in the sensing range Ad1, as the raindrop quantity sensing prohibited time period. In order to reliably include the time period, during which the wiper blade 10 moves in the sensing range Ad, into the raindrop quantity sensing prohibited time period, and also to tolerate the above variations, the raindrop quantity sensing prohibited time period (the predetermined time period T3 and the predetermined time period T4) includes the corresponding time period, during which the wiper blade 10 moves outside the sensing range Ad1. Each of the predetermined time period T3 and the predetermined time period T4 is preset depending on the wiping level (the intermittent time interval and the wiping speed) of the wiper blade 10. In this way, the second prohibited time period setting arrangement 42 sets the return stroke raindrop quantity sensing prohibited time period and the raindrop quantity sensing execution time period for the measurement signal of the raindrop sensor 20.

However, in the forward stroke period for moving the wiper blade 10 from the stop position to the return position, it is difficult to set a time period, during which the wiper blade 10 passes the sensing range Ad1, as a forward stroke raindrop quantity sensing prohibited time period in the same manner as that of the second prohibited time period setting arrangement 42. This reason will be described with reference to FIG. 3.

Figure 3:
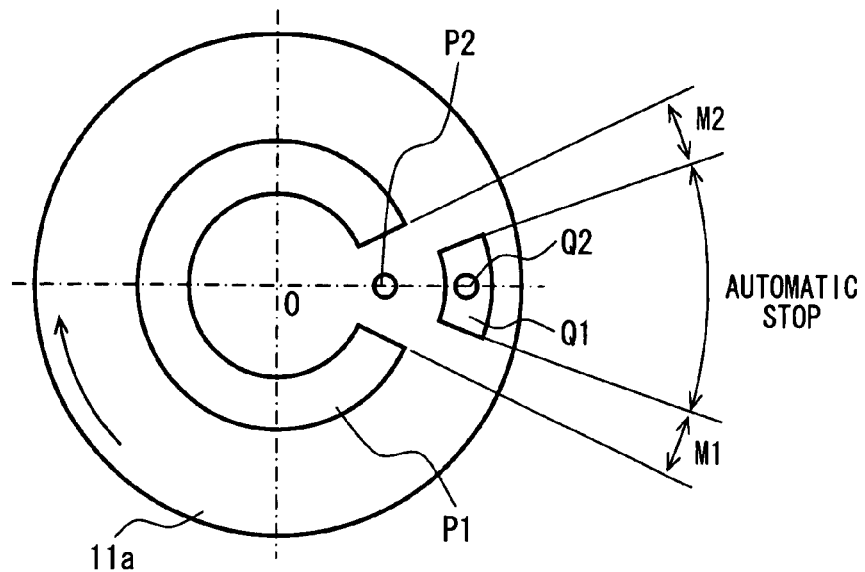
FIG. 3 is a diagram showing an internal structure of a wiper motor of the wiper control system according to the present embodiment.

FIG. 3 shows a structure of a circular rotatable disk (an operating signal outputting means) 11a, which rotates about a rotational center O upon rotation of a drive shaft of the wiper motor 11. When the disk 11a is rotated, the above-described operating signal, which is required by the second prohibited time period setting arrangement 42 to set the return stroke raindrop quantity sensing prohibited time period, is outputted from the wiper motor 11.

As shown in FIG. 3, a generally C-shaped electrode P1 is arranged in a center portion of a surface of the disk 11a in a coaxial manner with respect to the rotational center O, and a generally trapezoidal electrode Q1 is arranged radially outward of the electrode P1 at an outer peripheral edge portion of the surface of the disk 11a. Furthermore a stationary terminal P2 is positioned on an imaginary circle, which is coaxial with the electrode P1 and along which the electrode P1 extends circumferentially, in such a manner that the terminal P2 is engageable with, i.e., is electrically connectable with the electrode P1 upon rotation of the disk 11a. Similarly, a stationary terminal Q2 is positioned on an imaginary circle, which is coaxial with the electrode Q1 and along which the electrode Q1 extends circumferentially, in such a manner that the terminal Q2 is engageable with, i.e., is electrically connectable with the electrode Q1 upon rotation of the disk 11a. Furthermore, two margins M1, M2 are circumferentially placed between the electrode P1 and the electrode Q1 on a clockwise side and a counterclockwise side, respectively, of the electrode Q1. In each of these margins M1, M2, the electrode P1 is electrically disconnected from the terminal P2, and the electrode Q1 is electrically disconnected from the terminal Q2.

For the descriptive purpose, it is now assumed that the wiper motor 11 is driven from a stopped state to an operating state to cause rotation of the drive shaft of the wiper motor 11 as well as rotation of the disk 11a from a stopped state shown in FIG. 3 in, for example, the clockwise direction in FIG. 3. As shown in FIG. 3, in the stopped state of the wiper motor 11, the electrode Q1 is already connected to the terminal Q2, and thereby the wiper motor 11 outputs a negate signal, which indicates that the wiper motor 11 is in the stopped state. When the wiper motor 11 begins to rotate from the stopped state shown in FIG. 3 to rotate the disk 11a in the clockwise direction, the disk 11a is brought into a state where the electrode P1 is electrically disconnected from the terminal P2, and the electrode Q1 is electrically disconnected from the terminal Q2. In such a state, the wiper motor 11 does not output the operating signal or the negate signal. When the disk 11a is further rotated in the same direction, the electrode P1 is electrically connected with the terminal P2. As long as the electrode P1 is electrically connected with the terminal P2, the wiper motor 11 outputs the operating signal to the wiper control arrangement 41. Specifically, the wiper motor 11 outputs the operating signal after the lapse of the predetermined delay time period from the time point of shifting of the operational state of the wiper motor 11 from the stopped state to the operating state.

Thereafter, when the disk 11a is further rotated in the clockwise direction, the disk is placed in the above-described state where the electrode P1 is electrically disconnected from the terminal P2, and the electrode Q1 is electrically disconnected from the terminal Q2. At this time, the wiper motor 11 does not output the operating signal or the negate signal. Then, when the disk 11a is further rotated in the clockwise direction, the disk 11a is placed in the stopped state where the electrode Q1 is electrically connected to the terminal Q2, and thereby the wiper motor 11 outputs the negate signal to the wiper control arrangement 41. That is, the wiper motor 11 outputs the operating signal in advance before the shifting from the operating state to the stopped state of the wiper motor 11.

Therefore, the margins M1, M2 are provided in the disk 11*a* of the wiper motor 11 to limit simultaneous output of the operating signal and the negate signal from the wiper motor 11, i.e., to limit short-circuiting between the terminal P2 and the terminal Q2. Due to the provision of the margins M1, M2, the operating signal does not indicate the actual operating state of the wiper motor 11. Thus, as in the case of the present embodiment, when the raindrop sensor 20 is provided at the lower part of the wiping range of the windshield, i.e., is placed adjacent to the stop position of the wiper blade 10, the sensing range Ad1 of the raindrop sensor 20 is placed adjacent to the stop position of the wiper blade 10. Therefore, it would happen that the wiper blade 10 has already passed the sensing range Ad1 before the outputting of the operating signal from the wiper motor 11 upon the actual shifting from the stopped state to the operating state of the wiper motor 11. In such a case, it is impossible to set the time period, during which the wiper blade 10 passes the sensing range Ad1 of the raindrop sensor 20, as the raindrop quantity sensing prohibited time period. Thus, it is not possible to eliminate the influences of the wiper blade 10, which passes through the sensing range Ad1 of the raindrop sensor 20, on the result of the determination of the quantity of raindrops. Therefore, it is difficult to accurately determine the quantity of raindrops in the sensing range Ad1 of the raindrop sensor 20.

Thus, as shown in FIG. 2, the first prohibited time period setting arrangement 43 first obtains information of whether the drive command signal is supplied from the wiper control arrangement 41 to the wiper motor 11. Then, in the forward stroke period of the wiper blade 10 for moving from the stop position to the return position, a time period, during which the wiper blade 10 is predicted to pass through the sensing range Ad1 of the raindrop sensor 20, is set as the forward stroke raindrop quantity sensing prohibited time period based on an elapsed time from the time point of supplying the drive command signal.

Specifically, the first prohibited time period setting arrangement 43 sets the forward stroke raindrop quantity sensing prohibited time period as follows. That is, the first prohibited time period setting arrangement 43 sets a time point, at which a predetermined time period T1 has elapsed since the time point of supplying the drive command signal, as a start time point of the forward stroke raindrop quantity sensing prohibited time period. Furthermore, the first prohibited time period setting arrangement 43 sets a time point, at which a predetermined time period T2 has elapsed since the time point of supplying the drive command signal, as an end time point of the forward stroke raindrop quantity sensing prohibited time period. Here, similar to the predetermined time period T3, the predetermined time period T1 is set to a continuous time period, which includes a time period between the time point of supplying the drive command signal and the time point of reaching of the wiper blade 10 to the sensing range Ad1 in the forward stroke period of the wiper blade 10, and a predetermined tolerance time period (a minus tolerance time period to be subtracted). Here, similar to the predetermined time period T4, the predetermined time period T2 is set to a continuous time period, which includes a time period between the time point of supplying the drive command signal and the time point of leaving of the wiper blade 10 out of the sensing range Ad1 in the forward stroke period of the wiper blade 10, and a predetermined tolerance time period (a plus tolerance time period to be added). Therefore, the predetermined time period T2 is set to be longer than the predetermined time period T1. The reason for including the tolerance time period is the same as the reason described with reference to the second prohibited time period setting arrangement 42 and thereby will not be described for the sake of simplicity. Furthermore, similar to the predetermined time period T3 and the predetermined time period T4, each of the predetermined time period T1 and the predetermined time period T2 is preset depending on the wiping level (the intermittent time interval and the wiping speed) of the wiper blade 10.

Here, the drive command signal, which is supplied from the wiper control arrangement 41 to the wiper motor 11, is a signal that causes the generation of the drive force in the wiper motor 11 and serves as a command signal for shifting the operational state of the wiper blade 10 from the stopped state to the operating state. Due to the required rise time of the drive current and the presence of backlash of the gears in the wiper motor 11, the shifting of the operational state of the wiper blade 10 actually takes place after the lapse of the delay time period from the time point of supplying the drive command signal. Thus, as in the case of the present embodiment, even when the raindrop sensor 20 is provided at the lower part of the wiping range of the windshield, i.e., is placed adjacent to the stop position of the wiper blade 10 to place the sensing range Ad1 of the raindrop sensor 20 adjacent to the stop position of the wiper blade 10, the time period, during which the wiper blade 10 passes the sensing range Ad1 of the raindrop sensor 20, can be effectively set as the raindrop quantity sensing prohibited time period due to the fact that the shifting of the operational state of the wiper blade 10 from the stopped state to the operating state can be known in advance. Therefore, the raindrop quantity sensing execution time period can be effectively set. Here, the drive command signal may be a pulse signal, which is coded to indicate the wiping pattern of the wiper blade 10. Specifically, in addition to the command, which causes the generation of the drive force in the wiper motor 11, the drive signal may include a command, which indicates the wiping pattern of the wiper blade 10, such as a single execution of the reciprocal wiping movement at the wiping speed set for the LO mode, a continuous execution of the reciprocal wiping movement at the wiping speed set for the LO mode, a continuous execution of the reciprocal wiping movement at the wiping speed set for the HI mode. Upon reception of such a command signal, the wiper motor 11 executes the reciprocal wiping movement of the wiper blade 10 at the corresponding wiping pattern, which is indicated by the command signal.

The determining arrangement 44 obtains information of the raindrop quantity sensing prohibited time periods, which are set by the first and second prohibited time period setting arrangements 43, 42. The quantity of raindrops on the windshield is determined based on the amount of change in the measurement signal, which is outputted from the raindrop sensor 20 in the raindrop quantity sensing execution time period that is other than the raindrop quantity sensing prohibited time periods. Specifically, the determining arrangement 44 obtains the measurement signal of the raindrop sensor 20 at predetermined time intervals (e.g., 0.5 milliseconds) during the raindrop quantity sensing execution time period, which is other than the raindrop quantity sensing prohibited time periods that are set by the first and second prohibited time period setting arrangements 43, 42. An initial measured value of the measurement signal of the raindrop sensor 20, which is obtained at beginning of the raindrop quantity sensing execution time period is used as a reference value. Then, a subsequent measured value of the measurement signal, which is measured after the initial measured value, is obtained from the raindrop sensor 20. This subsequent measured value may be a value obtained at the end of the raindrop quantity sensing execution time period or any point between the time of measuring the initial measured value and the end of the raindrop quantity sensing execution time period. Thereafter, the amount of change between the initial measured value of the measurement signal and the subsequent measured value of the measurement signal is computed. Based on this amount of change, the determining arrangement 44 determines the quantity of raindrops in the sensing range. For example, when the amount of change is relatively small, the determining arrangement 44 may determine that a small quantity of raindrops is present in the sensing range Ad1. In contrast, when the amount of change is relatively large, the determining arrangement 44 may determine that a large quantity of raindrops is present in the sensing range Ad1.

Figure 4:
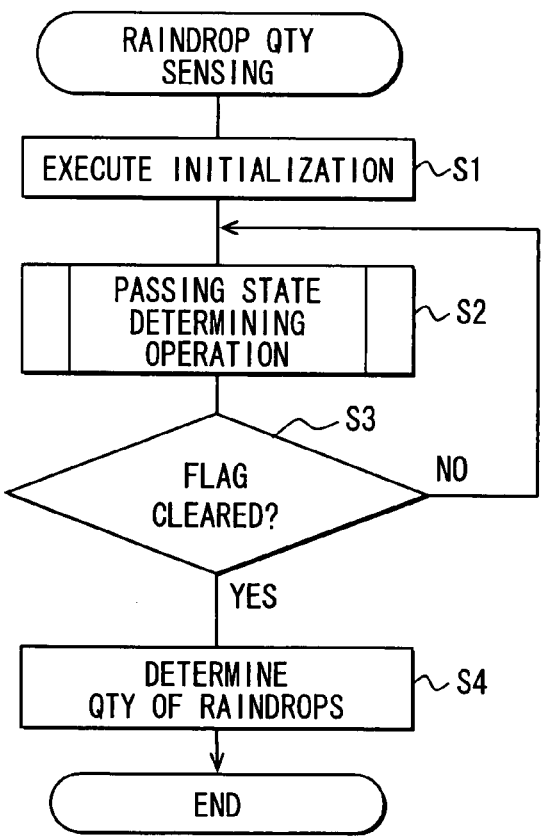
FIG. 4 is a flowchart showing a raindrop quantity sensing operation of the embodiment.

Now, the raindrop quantity sensing operation and a wiper passing state determining operation, which are executed by the raindrop quantity sensing apparatus, will be described in detain with reference to FIGS. 4 and 5. FIG. 4 is a flowchart showing a specific procedure of the raindrop quantity sensing operation, which is mainly executed by the determining arrangement 44 of the raindrop quantity sensing apparatus.

When the AUTO mode is selected by the user of the vehicle through the manual operation of the wiper switch, the raindrop quantity sensing operation shown in FIG. 4 is started. When this operation is started, the determining arrangement 44 resets various counters and clears various flags in the microcomputer 40 in an initialization process at step S1. Specifically, for example, a wiper passing state flag is cleared, and a first time counter and a second time counter are reset. When the wiper passing state flag is set, it indicates that the raindrop quantity sensing apparatus is in the raindrop quantity sensing prohibited time period. In contrast, when the wiper passing state flag is cleared, it indicates that the raindrop quantity sensing apparatus is in the raindrop quantity sensing execution time period. Furthermore, the first time counter is a counter that measures an elapsed time from the time point of supplying the drive command signal, and the second time counter is a counter that measures an elapsed time from the time point of sensing the leading edge of the operating signal. Then, the determining arrangement 44 proceeds to step S2. At step S2, the determining arrangement 44 commands the first and second prohibited time period setting arrangements 43, 42 to execute the wiper passing state determining operation shown in FIGS. 5A and 5B.

Next, the determining arrangement 44 proceeds to step S3. At step S3, the determining arrangement 44 determines whether the wiper passing state flag, which is set by the first or second prohibited time period setting arrangement 43, 42, is cleared. When it is determined that the wiper passing state flag, which is set by the first or second prohibited time period setting arrangement 43, 42, is cleared at step S3 (i.e., YES at step S3), it indicates that the raindrop quantity sensing apparatus is in the raindrop quantity sensing execution time period, so that the wiper blade 10 is not currently passing the sensing range Ad1 of the raindrop sensor 20. Thus, the determining arrangement 44 proceeds to step S4. At step S4, the determining arrangement 44 determines the quantity of raindrops in the sensing range Ad1 based on the amount of change in the measurement signal of the raindrop sensor 20 in the manner described above.

In contrast, when it is determined that the wiper passing state flag is set at step S3 (i.e., NO at step S3), it indicates that the raindrop quantity sensing apparatus is in the raindrop quantity sensing prohibited time period, so that the wiper blade 10 may be currently passing the sensing range Ad1 of the raindrop sensor 20. Therefore, the determining arrangement 44 repeats steps S2, S3 without determining the quantity of raindrops in the sensing range Ad1 until the wiper passing state flag is cleared.

Figure 5A:
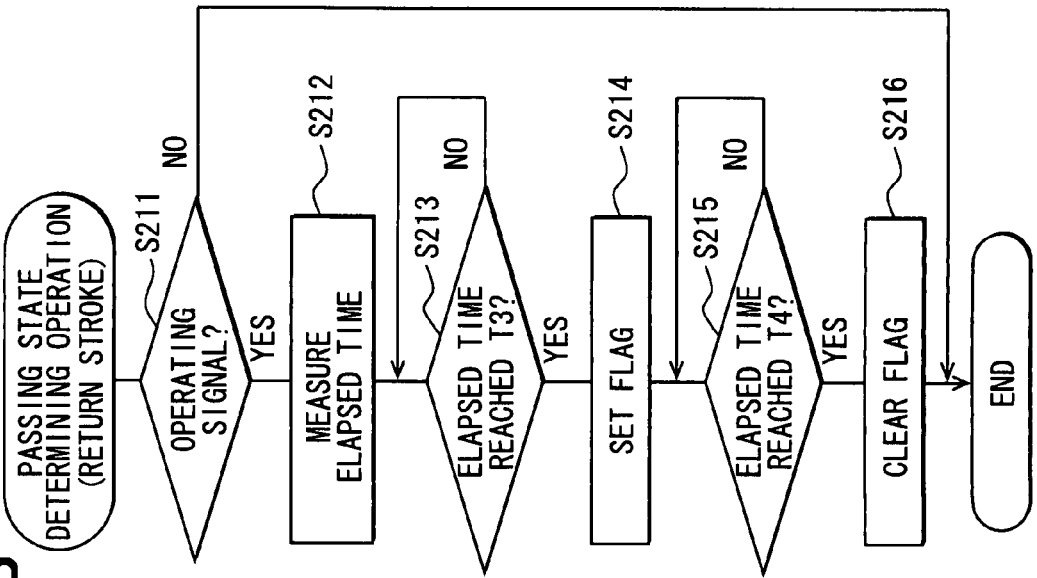
FIG. 5A is a flowchart showing a wiper passing state determining operation in a forward stroke period according to the embodiment.
Figure 5B:
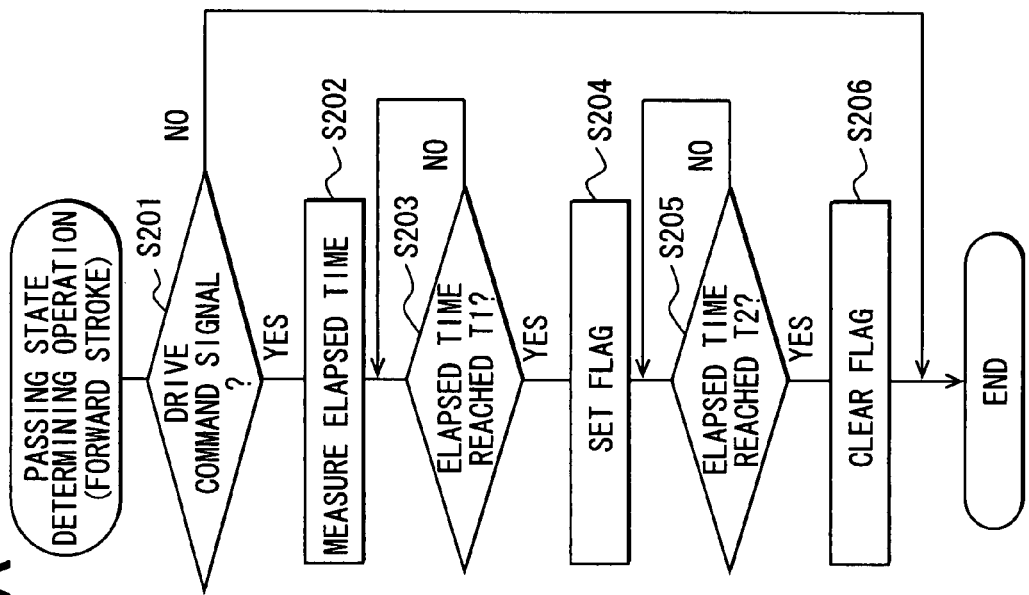
FIG. 5B is a flowchart showing a wiper passing state determining operation in a return stroke period according to the embodiment.

FIG. 5A is a flowchart showing a specific procedure of the wiper passing state determining operation in the forward stroke period executed mainly by the first prohibited time period setting arrangement 43. FIG. 5B is a flowchart showing a specific procedure of the wiper passing state determining operation in the return stroke period executed mainly by the second prohibited time period setting arrangement 42. At step S2 of FIG. 4, the wiper passing state determining operation is executed by each of the first and second prohibited time period setting arrangements 43, 42.

As shown in FIG. 5A, when the wiper passing state determining operation in the forward stroke period is started, the first prohibited time period setting arrangement 43 determines whether the drive command signal is supplied from the wiper control arrangement 41 to the wiper motor 11 at step S201. Here, when it is determined that the drive command signal is supplied from the wiper control arrangement 41 to the wiper motor 11 at step S201 (i.e., YES at step S201), the wiper motor is shifted from the stopped state to the operating state, so that the wiper blade 10 starts its forward stroke to move from the stop position to the return position. Thus, the first prohibited time period setting arrangement 43 proceeds to step S202. At step S202, the first prohibited time period setting arrangement 43 starts measurement of an elapsed time through a time measuring means (the first time counter) provided in the microcomputer 40.

Then, at step S203, the first prohibited time period setting arrangement 43 determines whether a value of the first time counter has reached a first preset value, which indicates the end of the predetermined time period T1. When it is determined that the value of the first time counter has not reached the first preset value at step S203 (i.e., NO at step S203), this step S203 is repeated until YES is returned at step S203. In contrast, when YES is returned at step S203, the first prohibited time period setting arrangement 43 proceeds to step S204. At step S204, the first prohibited time period setting arrangement 43 sets the wiper passing state flag. Then, at step S205, the first prohibited time period setting arrangement 43 determines whether the value of the first time counter has reached a second preset value, which indicates the end of the predetermined time period T2. When it is determined that the value of the first time counter has not reached the second preset value at step S205 (i.e., NO at step S205), this step S205 is repeated until YES is returned at step S205. In contrast, when YES is returned at step S205, the first prohibited time period setting arrangement 43 proceeds to step S206. At step S206, the first prohibited time period setting arrangement 43 clears the wiper passing state flag. In this way, the first prohibited time period setting arrangement 43 sets the time period, during which the wiper blade 10 passes the sensing range Ad1 in the forward stroke, as the forward stroke raindrop quantity sensing prohibited time period.

When the wiper passing state flag is cleared in the above-described manner, the first prohibited time period setting arrangement 43 outputs information of the cleared state of the wiper passing state flag to the determining arrangement 44, and the current operation is terminated.

As shown in FIG. 5B, when the wiper passing state determining operation in the return stroke period is started, the second prohibited time period setting arrangement 42 determines whether the operating signal is outputted from the wiper motor 11 at step S211. Here, when it is determined that the operating signal is outputted from the wiper motor 11 at step S211 (i.e., YES at step S211), the wiper motor 11 is actually in the operating state, so that the wiper blade 10 is currently moving from the stop position to the return position (the forward stroke) or is currently moving from the return position to the stop position (the return stroke). Thus, the second prohibited time period setting arrangement 42 proceeds to step S212. At step S212, the second prohibited time period setting arrangement 42 starts measurement of an elapsed time through a time measuring means (the second time counter) provided in the microcomputer 40.

Then, at step S213, the second prohibited time period setting arrangement 42 determines whether a value of the second time counter has reached a first preset value, which indicates the end of the predetermined time period T3. When it is determined that the value of the second time counter has not reached the first preset value at step S213 (i.e., NO at step S213), this step S213 is repeated until YES is returned at step S213. In contrast, when YES is returned at step S213, the second prohibited time period setting arrangement 42 proceeds to step S214. At step S214, the second prohibited time period setting arrangement 42 sets the wiper passing state flag. Similarly, at step S215, the second prohibited time period setting arrangement 42 determines whether the value of the second time counter has reached a second preset value, which indicates the end of the predetermined time period T4. When it is determined that the value of the second time counter has not reached the second preset value at step S215 (i.e., NO at step S215), this step S215 is repeated until YES is returned at step S215. In contrast, when YES is returned at step S215, the second prohibited time period setting arrangement 42 proceeds to step S216. At step S216, the second prohibited time period setting arrangement 42 clears the wiper passing state flag. In this way, the second prohibited time period setting arrangement 42 sets the time period, during which the wiper blade 10 passes the sensing range Ad1 in the return stroke, as the return stroke raindrop quantity sensing prohibited time period.

When the wiper passing state flag is cleared in the above-described manner, the second prohibited time period setting arrangement 42 outputs information of the cleared state of the wiper passing state flag to the determining arrangement 44, and the current operation is terminated.

Figure 6A:
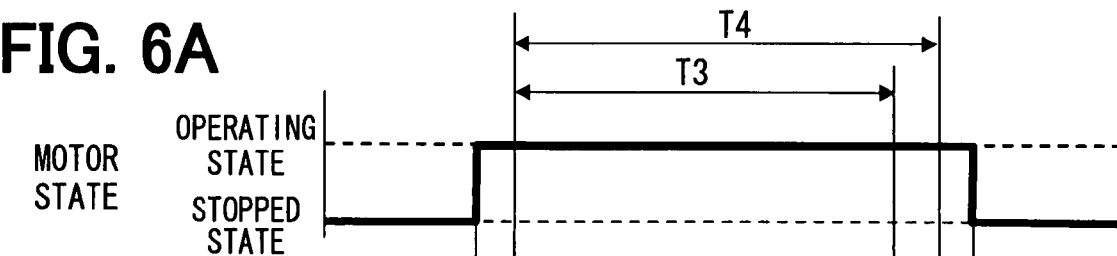
FIG. 6A is a timing chart showing a change in an operational state of the wiper motor with time according to the embodiment.
Figure 6B:
FIG. 6B is a timing chart showing a change in an operating signal with time according to the embodiment.
Figure 6C:
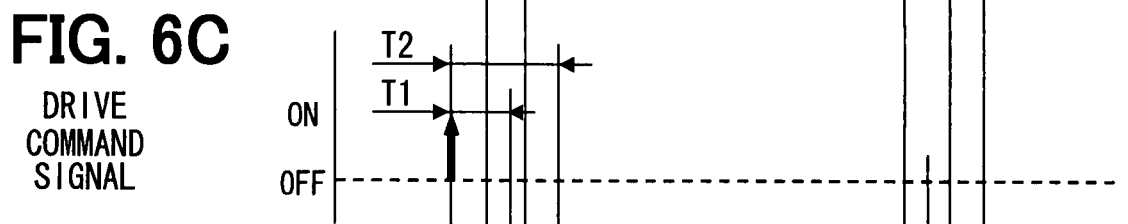
FIG. 6C is a timing chart showing a change in a drive command signal with time according to the embodiment.
Figure 6D:
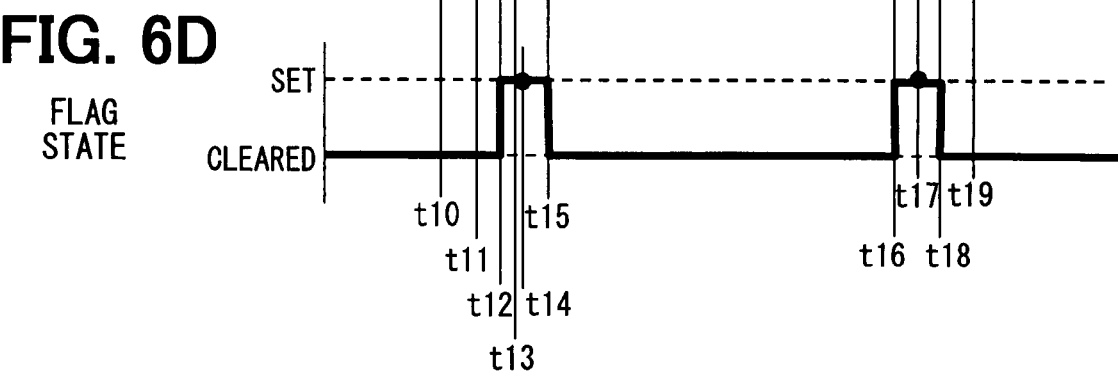
FIG. 6D is a timing chart showing a change in a wiper passing state flag with time according to the embodiment.

FIG. 6A is a timing chart showing a change in the operational state of the wiper motor 11 with time. FIG. 6B is a timing chart showing a change in the operating signal with time. FIG. 6C is a timing chart showing a change in the drive command signal with time. FIG. 6D is a timing chart showing a change in the wiper passing state flag with time. Now, the operation of the present embodiment will be summarized in view of FIGS. 6A to 6D.

Here, for the descriptive purpose, it is now assumed that the AUTO mode is selected through the manual operation of the wiper switch by the user of the vehicle, and the raindrop quantity sensing operation of FIG. 4 and the wiper passing state determining operation of FIGS. 5A and 5B have been already started.

When the determining arrangement 44 determines that the raindrops are present in the sensing range Ad1 of the raindrop sensor 20, and thereby it is required to wipe the wiping range of the windshield through the reciprocal swing movement of the wiper blade 10, the wiper control arrangement 41 supplies the drive command signal in the form of the pulse signal to the wiper motor 11 at the time (time point) t10, as shown in FIG. 6C. The drive command signal includes the information of the wiping level (the wiping speed and the intermittent time interval) of the wiper blade 10.

When the drive command signal in the form of the pulse signal is supplied from the wiper control arrangement 41 to the wiper motor 11, the first prohibited time period setting arrangements 43 starts the first time counter to start the measuring of the elapsed time, as shown in FIG. 6D. When the drive command signal is supplied, the wiper motor 11 is shifted from the stopped state to the operating state. However, as indicated in FIG. 6A, the wiper motor 11 is actually-shifted from the stopped state to the operating state at, for example, the time (time point) t11 after the lapse of the delay time period from the time t10, at which the drive command signal is supplied. Thus, the wiper blade, 10 is moved from the stop position to the return position (the forward stroke). As discussed above, the delay (from the time t10 to the time t11) is caused by, for example, the required rise time of the drive current and the presence of backlash of the gears in the wiper motor 11.

As shown in FIG. 6D, the first prohibited time period setting arrangement 43 sets the wiper passing state flag at, for example, the time (time point) t12 upon the lapse of the predetermined time period T1 from the time t10. Then, the first prohibited time period setting arrangement 43 clears the wiper passing state flag at, for example, the time (time point) t15 upon the lapse of the predetermined time period T2 from the time t10. The wiper blade 10 actually reaches the sensing range Ad1 of the raindrop sensor 20 at, for example, time (time point) t14 that is after the time t12 but before the time t15. However, due to the presence of the variations in the wiping level (the intermittent time interval and the wiping speed) of the wiper blade 10 and the variations in the location of the raindrop sensor 20, the first prohibited time period setting arrangement 43 starts the forward stroke raindrop quantity sensing prohibited time period at the time t12 and terminates the forward stroke raindrop quantity sensing prohibited time period at the time t15. By providing the tolerance time period, the above variations are alleviated.

Thereafter, the wiper blade 10 leaves the sensing range Ad1 and reaches the return position. Then, the wiper blade 10 moves once again from the return position to the stop position (the return stroke).

As shown in FIG. 6B, the wiper motor 11 outputs the operating signal to the second prohibited time period setting arrangement 42 at the time (time point) t13 that is after the time t11, at which the wiper motor 11 is actually shifted from the stopped state to the operating state. Due to the reasons discussed with reference to FIG. 3 or the internal structural limitations of the wiper motor 11, this delay (from the time t11 to the time t13) is inevitable.

When the operating signal is outputted at the time t13, the second prohibited time period setting arrangement 42 starts the second time counter to measure the elapsed time. Then, the second prohibited time period setting arrangement 42 sets the wiper passing state flag at, for example, the time (time point) t16 upon the lapse of the predetermined time period T3 from the time t13. Thereafter, the second prohibited time period setting arrangement 42 clears the wiper pasting state flag at, for example, the time (time point) t18 upon the lapse of the predetermined time period T4 from the time t13. The wiper blade 10 actually reaches the sensing range Ad1 of the raindrop sensor 20 at, for example, the time (time point) t17 that is after the time t16 but before the time t18. However, due to the presence of the variations in the wiping level (the intermittent time interval and the wiping speed) of the wiper blade 10 and the variations in the location of the raindrop sensor 20, the second prohibited time period setting arrangement 42 starts the return stroke raindrop quantity sensing prohibited time period at the time t16 and terminates the return stroke raindrop quantity sensing prohibited time period at the time t18. By providing the tolerance time period, the above variations are alleviated. When the wiper motor 11 is driven further, the operational state of the wiper motor 11 is shifted from the operating state to the stopped state at, for example, the time (time point) t19.

The present invention is not limited to the above embodiment, and the above embodiment may be modified as follows.

In the above embodiment, the determining arrangement 44 determines the quantity of raindrops on the windshield based on the amount of change in the measurement signal of the raindrop sensor 20 in the raindrop quantity sensing execution time period, which is outside of the raindrop quantity sensing prohibited time periods that are set by the first and second prohibited time period setting arrangements 43, 42. However, the way of determining the quantity of raindrops is not limited to the above one. That is, the determining arrangement 44 may set a plurality of thresholds with respect to the measurement signal of the raindrop sensor 20 (or with respect to the amount of change in the measurement signal of the raindrop sensor 20 described above). Then, the determining arrangement 44 may determine the quantity of raindrops based on an approaching state of the measurement signal of the raindrop sensor 20 relative to the thresholds (or an approaching state of the amount of change in the measurement signal of the raindrop sensor 20 relative to the corresponding thresholds). Specifically, for example, when the measurement signal (or the amount of change in the measurement signal) of the raindrop sensor 20 is below the thirst threshold, the quantity of raindrops in the sensing range Ad1 is relatively large. Thus, the determining arrangement 44 determines that there is a large rainfall. When the measurement signal (or the amount of change in the measurement signal) of the raindrop sensor 20 is greater than the first threshold but is below the second threshold, the quantity of raindrops in the sensing range Ads is moderate. Thus, the determining arrangement 44 determines that there is a moderate rainfall. When the measurement signal (or the amount of change in the measurement signal) of the raindrop sensor 20 is greater than the second threshold but is below the third threshold, the quantity of raindrops in the sensing range Ad1 is relatively small. Thus, the determining arrangement 44 determines that there is a small rainfall. When the measurement signal (or the amount of change in the measurement signal) of the raindrop sensor 20 is greater than the third threshold, the quantity of raindrops in the sensing range Ads is zero or very small. Thus, the determining arrangement 44 determines that there is no rainfall. As described above, the quantity of raindrops on the windshield can be determined based on the measurement signal, which is outputted from the raindrop sensor 20 during the raindrop quantity sensing execution time period.

In the above embodiment, the tolerance time period is included in the predetermined time period T3 in addition to the time period between the time point of starting the outputting of the operating signal and the time point of reaching of the wiper blade 10 to the sensing range Ad1 in the return stroke period of the wiper blade 10 from the return position to the stop position. Also, the tolerance time period is included in the predetermined time period T4 in addition to the time period between the time point of starting the outputting of the operating signal and the time point of leaving of the wiper blade 10 out of the sensing range Ad1 in the return stroke period of the wiper blade 10. Alternatively, the above tolerance time period may be eliminated from the predetermined time period T3, and the above tolerance time period may be eliminated from the predetermined time period T4. That is, all required is that the time period, during which the wiper blade 10 passes the sensing range Ad1 of the raindrop sensor 20 in the return stroke period of the wiper blade 10, is set as the return stroke raindrop quantity sensing prohibited time period based on the elapsed time from the time point of measuring of the leading edge of the operating signal. Also, the tolerance time period may be eliminated from each of the predetermined time periods T1, T2.

Figure 7:
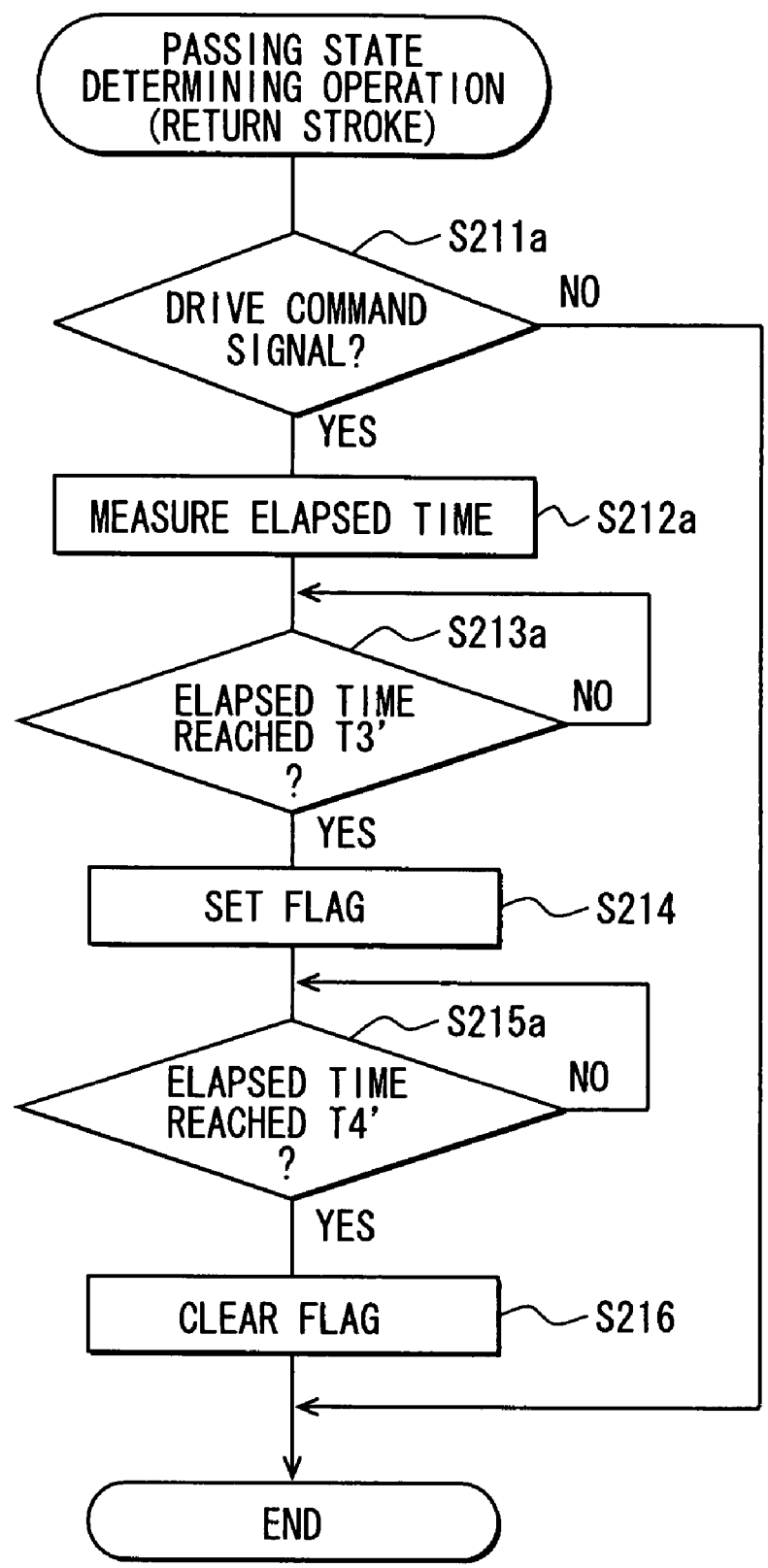
FIG. 7 is a flowchart showing a modification of the wiper passing state determining operation in the return stroke period.

Furthermore, the second prohibited time period setting arrangement 42 may be eliminated, if desired. In such a case, the first prohibited time period setting arrangement 43 may set the time period, during which the wiper blade 10 passes through the sensing range Ad1 of the raindrop sensor 20 in the forward stroke period of the wiper blade 10, as the forward stroke raindrop quantity sensing prohibited time period based on the elapsed time from the time point of supplying the drive command signal. Also, the first prohibited time period setting arrangement 43 may set the time period, during which the wiper blade 10 passes through the sensing range Ad1 of the raindrop sensor 20 in the return stroke period of the wiper blade 10, as the return stroke raindrop quantity sensing prohibited time period based on the elapsed time from the time point of supplying the drive command signal. Specifically, in addition to the operation described with reference to FIG. 5A, the first prohibited time period setting arrangement 43 may also execute a wiper passing state determining operation in the return stroke period shown in FIG. 7, which is similar to the wiper passing state determining operation in the return stroke period shown in FIG. 5B except steps S211-S213, S215, which are now replaced with steps S211a-S213a, S215a in FIG. 7. Specifically, when the wiper passing state determining operation in the return stroke period is started, the first prohibited time period setting arrangement 43 determines whether the drive command signal is supplied from the wiper control arrangement 41 to the wiper motor 11 at step S211a. This step S211a is the same as step S201 of FIG. 5 due to the fact the same first prohibited time period setting arrangement 43, which execute the operation of FIG. 5A, is executing the operation of FIG. 7. Furthermore, this operation of FIG. 7 may be executed simultaneously with the operation of FIG. 5A by the first prohibited time period setting arrangement 43. When NO is returned at step S211a, the current operation is terminated. In contrast, when YES is returned at step S211a, the first prohibited time period setting arrangement 43 proceeds to step S212a. At step S212a, the first prohibited time period setting arrangement 43 starts measurement of an elapsed time through the first time counter. This step S212a is the same as that of step 202 of FIG. 5A due to the fact the same first time counter is used in both of the forward stroke period and the return stroke period. Then, at step S213a, the first prohibited time period setting arrangement 43 determines whether a value of the first time counter has reached an end of a predetermined time period T3'. Here, the predetermined time period T3' is set to a continuous time period, which includes a time period between the time point of supplying the drive command signal and the time point of reaching of the wiper blade 10 to the sensing range Ad1 in the return stroke period of the wiper blade 10, and the predetermined tolerance time period. When NO is returned at step S213a, this step S213a is repeated until YES is returned at step S213a. When YES is returned at step S213a, the first prohibited time period setting arrangement 43 proceeds to step S214. At step S214, the wiper passing state flag is set. Then, at step S215a, the first prohibited time period setting arrangement 43 determines whether the value of the first time counter has reached an end of a predetermined time period T4'. The predetermined time period T4' is set to a continuous time period, which includes a time period between the time point of supplying the drive command signal and the time point of leaving of the wiper blade 10 out of the sensing range Ad1 in the return stroke period of the wiper blade 10, and the predetermined tolerance time period. When NO is returned at step S215*a*, this step 215*a* is repeated until YES is returned at step S215*a*. When YES is returned at step S215*a*, the following step S216 is executed in a manner similar to the one discussed with reference to FIG. 5B.

In the above modification, the tolerance time period is included in the predetermined time periods T1, T2 as well as in the predetermined time periods T3', T4' in addition to the time period from the time point of supplying the drive command signal to the time point of reaching of the wiper blade 10 to the sensing range Ad1 or the time point of leaving of the wiper blade 10 out of the sensing range Ad1 in the forward stroke period or in the return stroke period. However, such a tolerance time period may be eliminated, if, desired. That is, all required is that the first prohibited time period setting arrangement 43 sets the time period, during which the wiper blade 10 passes the sensing range Ad1 of the raindrop sensor 20, as the raindrop quantity sensing prohibited time period based on the elapsed time from the time point of supplying the drive command signal to the wiper motor 11.

In the above embodiment, the raindrop sensor 20 is placed at the sensing range Ad1 (FIG. 1), which is adjacent to the stop position of the wiper blade 10, i.e., at the lower part of the wiping range of the windshield. However, the location of the raindrop sensor 20 is not limited to this. Alternative to or in addition to the sensing range Ad1 in FIG. 1, the raindrop sensor 20 may be placed at another location, which is outside of the installation prohibited area (B area in FIG. 1). For example, the raindrop sensor 20 may be placed at a sensing range Ad2 in FIG. 1, which is at an upper part of the wiping range of the windshield.

In the above embodiment (as well as the above modifications), the raindrop quantity sensing apparatus and the wiper control system are installed in the automobile. However, the raindrop quantity sensing apparatus and the wiper control system may be installed to any other vehicle. Such a vehicle may include an airplane, a train or the like.

In the above embodiment, the disk 11*a* having the electrodes P1, Q1 is rotated while the terminals P2, Q2 are held stationary. Alternatively, the electrodes P1, Q1 may be kept stationary while the terminals P2, Q2 are provided to a rotatable disk, which is rotated upon rotation of the wiper motor 11.

Additional advantages and modifications will readily occur to those skilled in the art. The invention in its broader terms is therefore not limited to the specific details, representative apparatus, and illustrative examples shown and described.

What is claimed is:

1. A raindrop quantity sensing apparatus for measuring a quantity of raindrops on a windshield of a vehicle, on which a wiper blade of a wiper apparatus is reciprocally swung between a stop position and a return position in a wiping range of the windshield by a drive force generated from a drive source of the wiper apparatus, which is driven every time a drive command signal is supplied to the drive source, the raindrop quantity sensing apparatus comprising:

a raindrop sensor that outputs a measurement signal, which corresponds to the quantity of raindrops in a predetermined sensing range in the wiping range on the windshield;

a prohibited time period setting means for setting a time period, during which the wiper blade is predicted to pass through the predetermined sensing range, as a raindrop quantity sensing prohibited time period based on an elapsed time from a time point of supplying the drive command signal to the drive source; and a determining means for determining the quantity of raindrops on the windshield based on the measurement signal outputted from the raindrop sensor in a raindrop quantity sensing execution time period, which is outside of the raindrop quantity sensing prohibited time period.

2. The raindrop quantity sensing apparatus according to claim 1, wherein:

the prohibited time period setting means is a first prohibited time period setting means and sets the raindrop quantity sensing prohibited time period as a forward stroke raindrop quantity sensing prohibited time period in a forward stroke period for moving the wiper blade from the stop position to the return position;

the elapsed time from the time point of supplying the drive command signal to the drive source is a first elapsed time;

the first prohibited time period setting means further sets a time period, during which the wiper blade is predicted to pass through the predetermined sensing range in a return stroke period for moving the wiper blade from the return position to the stop position, as a return stroke raindrop quantity sensing prohibited time period based on a second elapsed time from the time point of supplying the drive command signal to the drive source; and the raindrop quantity sensing execution time period is outside of the forward stroke raindrop quantity sensing prohibited time period and the return stroke raindrop quantity sensing prohibited time period.

3. The raindrop quantity sensing apparatus according to claim 1, wherein:

the prohibited time period setting means is a first prohibited time period setting means and sets the raindrop quantity sensing prohibited time period as a forward stroke raindrop quantity sensing prohibited time period in a forward stroke period for moving the wiper blade from the stop position to the return position;

the raindrop quantity sensing apparatus further comprises a second prohibited time period setting means for setting a time period, during which the wiper blade is predicted to pass through the predetermined sensing range in a return stroke period for moving the wiper blade from the return position to the stop position, as a return stroke raindrop quantity sensing prohibited time period based on an elapsed time from a time point of sensing a leading edge of an operating signal, which is outputted from an operating signal outputting means of the wiper apparatus when the wiper blade is reciprocally swung; and the raindrop quantity sensing execution time period is outside of the forward stroke raindrop quantity sensing prohibited time period and the return stroke raindrop quantity sensing prohibited time period.

4. The raindrop quantity sensing apparatus according to claim 1, wherein the prohibited time period setting means sets the raindrop quantity sensing prohibited time period as a continuous time period that includes:

a time period between a time point of reaching of the wiper blade to the sensing range and a time point of leaving of the wiper blade out of the sensing range;

a predetermined tolerance time period that is provided before the time point of reaching of the wiper blade to the sensing range; and a predetermined tolerance time period that is provided after the time point of leaving of the wiper blade out of the sensing range.

5. The raindrop quantity sensing apparatus according to claim 1, wherein:
the drive command signal is a pulse signal, which is coded to indicate a wiping pattern of the wiper blade; and
the wiper blade is reciprocally swung at the wiping pattern, which is indicated by the drive command signal.

6. The raindrop quantity sensing apparatus according to claim 1, wherein the determining means determines the quantity of raindrops on the windshield based on an amount of change in the measurement signal, which is outputted from the raindrop sensor during the raindrop quantity sensing execution time period.

7. The raindrop quantity sensing apparatus according to claim 1, wherein the sensing range of the raindrop sensor is set adjacent to the stop position of the wiper blade.

8. The raindrop quantity sensing apparatus according to claim 7, wherein the sensing range of the raindrop sensor is set at a lower part of the wiping range of the windshield.

9. A wiper control system comprising:
a wiper apparatus that includes a drive source and a wiper blade, wherein the wiper blade is reciprocally swung between a stop position and a return position in a wiping range of a windshield by a drive force generated from the drive source, which is driven every time a drive command signal is supplied to the drive source;
a raindrop sensor that outputs a measurement signal, which corresponds to the quantity of raindrops in a predetermined sensing range in the wiping range on the windshield;
a prohibited time period setting means for setting a time period, during which the wiper blade is predicted to pass through the predetermined sensing range, as a raindrop quantity sensing prohibited time period based on an elapsed time from a time point of supplying the drive command signal to the drive source;
a determining means for determining the quantity of raindrops on the windshield based on the measurement signal outputted from the raindrop sensor in a raindrop quantity sensing execution time period, which is outside of the raindrop quantity sensing prohibited time period; and
a wiper control means for controlling the wiper apparatus according to the quantity of raindrops, which is determined by the determining means, wherein the wiper control means supplies the drive command signal to the drive source.

10. The wiper control system according to claim 9, wherein:
the first prohibited time period setting means is a first prohibited time period setting means and sets the raindrop quantity sensing prohibited time period as a forward stroke raindrop quantity sensing prohibited time period in a forward stroke period for moving the wiper blade from the stop position to the return position;
the elapsed time from the time point of supplying the drive command signal to the drive source is a first elapsed time;
the first prohibited time period setting means further sets a time period, during which the wiper blade is predicted to pass through the predetermined sensing range in a return stroke period for moving the wiper blade from the return position to the stop position, as a return stroke raindrop quantity sensing prohibited time period based on a second elapsed time from the time point of supplying the drive command signal to the drive source; and
the raindrop quantity sensing execution time period is outside of the forward stroke raindrop quantity sensing prohibited time period and the return stroke raindrop quantity sensing prohibited time period.

11. The wiper control system according to claim 9, wherein:
the prohibited time period setting means is a first prohibited time period setting means and sets the raindrop quantity sensing prohibited time period as a forward stroke raindrop quantity sensing prohibited time period in a forward stroke period for moving the wiper blade from the stop position to the return position;
the wiper control system further comprises a second prohibited time period setting means for setting a time period, during which the wiper blade is predicted to pass through the predetermined sensing range in a return stroke period for moving the wiper blade from the return position to the stop position, as a return stroke raindrop quantity sensing prohibited time period based on an elapsed time from a time point of sensing a leading edge of an operating signal, which is outputted from an operating signal outputting means of the wiper apparatus when the wiper blade is reciprocally swung; and
the raindrop quantity sensing execution time period is outside of the forward stroke raindrop quantity sensing prohibited time period and the return stroke raindrop quantity sensing prohibited time period.

12. The wiper control system according to claim 11, wherein:
the drive source is a wiper motor, which include the operating signal outputting means; and
the operating signal outputting means includes:
a rotatable disk, which is rotated upon rotation of the wiper motor and includes a C-shaped electrode that extends circumferentially along an imaginary arc; and
a stationary terminal that is stationarily positioned along the imaginary arc and is slidably engageable with the C-shaped electrode to electrically connect with the C-shaped electrode upon rotation of the rotatable disk, wherein the stationary terminal is disengaged from the C-shaped electrode at a time of stopping of the wiper motor and is engaged with the C-shaped electrode to output the operating signal after elapsing of a predetermined time period from the supplying of the drive command signal from the wiper control means to the wiper motor.

* * * * *